United States Patent [19]

Pessina et al.

[11] Patent Number: 4,938,070

[45] Date of Patent: Jul. 3, 1990

[54] CAN LID TESTER AND METHOD OF USE THEREOF

[75] Inventors: Robert J. Pessina, St. Louis; Robert F. Lamping, St. Charles, both of Mo.

[73] Assignee: J. P. Manufacturing Co., St. Louis, Mo.

[21] Appl. No.: 332,233

[22] Filed: Mar. 31, 1989

[51] Int. Cl.$^5$ .............................................. G01N 3/08
[52] U.S. Cl. ...................................................... 73/835
[58] Field of Search ...................... 73/835, 826, 834; 414/757, 779, 780, 781

[56] References Cited

U.S. PATENT DOCUMENTS 2,819,804  1/1958  Erdmann ........................ 414/757
4,850,230  7/1989  Eldridge .......................... 73/835

Primary Examiner—Jerry W. Myracle
Attorney, Agent, or Firm—Edward R. Weber

[57] ABSTRACT

A device which will automatically remove a lid from a stack of lids designated for testing, feed the selected lid to a testing position, orient the selected lid so that the easy-open feature is in the desired position, test the easy-open feature by engaging the tab located on the scored segment of the lid with a lifting finger and causing the lifting finger to activate the tab in the manner which a consumer would use by rotating the tab through an arc of at least ninety degrees, and then eject the tested lid from the device.

17 Claims, 3 Drawing Sheets

CAN LID TESTER AND METHOD OF USE THEREOF

FIELD OF THE INVENTION

The present invention relates to testing devices used to determine proper operation of tab operated easy-open features in can lids, such as those utilized for packaging beer or soft drinks, and particularly to testing devices which determine proper operation of non-detachable tab operated easy-open can lids.

BACKGROUND OF THE INVENTION

Metallic cans used as packaging for beer, soft drinks, and other liquid products are frequently provided with a can lid which includes an "easy-open" feature. This feature frequently consists of a scored or weakened segment to which a tab is affixed. To open the can, it is only necessary to lift the tab thereby causing the scoring to break and the scored segment of the can end to be depressed into the can. One source of consumer dissatisfaction occurs when activation of the tab results in the scored segment of the can lid being imperfectly opened. Another source of consumer dissatisfaction occurs when activation of the tab results in separation of the tab from the scored segment leaving the can unopened.

Since millions of cans incorporating this type of easy-open feature are utilized every day, it is necessary that some procedures be followed to ensure consistent quality of the can lids. One method randomly selects a statistically significant number of manufactured can lids which are then manually tested by employees. Such a procedure is generally undesirable because not only is it labor intensive but it also is extremely tiring for the employees involved and may result in injuries, such as strains of the finger or cuts from the can lids.

Many attempts have been made to mechanize the lid opening testing procedure. Typical of these are the devices and procedures disclosed by U.S. Pat. No. 3,318,143 (Helms), U.S. Pat. No. 3,464,261 (Helms), U.S. Pat. No. 3,559,471 (Schaffer), and U.S. Pat. No. 4,637,260 (Gilliam, et al.). None of these prior inventions, however, offer the features of a simple device which can rapidly test a large number of lids and duplicate the motion which is actually employed by a consumer when operating the easy-open feature. The devices disclosed in U.S. Pat. No. 3,318,143 (Helms), U.S. Pat. No. 3,464,261 (Helms), and U.S. Pat. No. 3,559,471 (Schaffer) are each single shot testing devices in which a lid is manually loaded into the machine. A linear force is then applied to the easy-open device to test the opening mechanism. Only U.S. Pat. No. 4,637,260 (Gilliam, et al.) provides a machine which automatically tests a plurality of lids. However, it is a complex machine employing a multiplicity of drive cylinders and sensing devices. Neither the device of Gilliam nor any of the other devices duplicates the rotating action actually employed by the consumer when operating the easy-open feature. Rather each tests the easy-open feature by applying an essentially linear force to the tab.

It is therefore among the objects of the present invention to provide a simple device which will test the easy-open feature of a plurality of can lids in a manner consistent with the actual use of the consumer. It is another object of the present invention to provide a device which will test a plurality of can lids in a consistent, repeatable manner. It is a further object of the present invention to provide a device which will automatically test a plurality of can lids without significant manual manipulation. Other objects and features will be in part apparent and in part pointed out hereinafter.

SUMMARY OF THE INVENTION

The present invention fulfills these objects by providing a device which will automatically remove a lid from a stack of lids designated for testing, feed the selected lid to the testing position, orient the selected lid so that the easy-open feature is in the desired position, activate the easy-open feature by engaging the tab located on the scored segment of the lid with a lifting finger and causing the lifting finger to activate the tab in the manner which a consumer would use by rotating the tab through an arc of at least ninety degrees, and then eject the tested lid from the device. Further, the apparatus is capable of speedily testing a plurality of lids without additional action on the part of an operator other than inspection of the tested lids to confirm that the easy-open feature has functioned properly. As an optional feature, this inspection function could be performed by any of several known sensing devices which could determine proper operation of the easy-open feature as the tested lid is ejected from the device of the present invention.

BRIEF DESCRIPTION OF THE DRAWINGS

The can lid tester of the present invention will be more fully understood and described with reference to the following drawings in which.

DETAILED DESCRIPTION OF THE INVENTION

Figure 1:
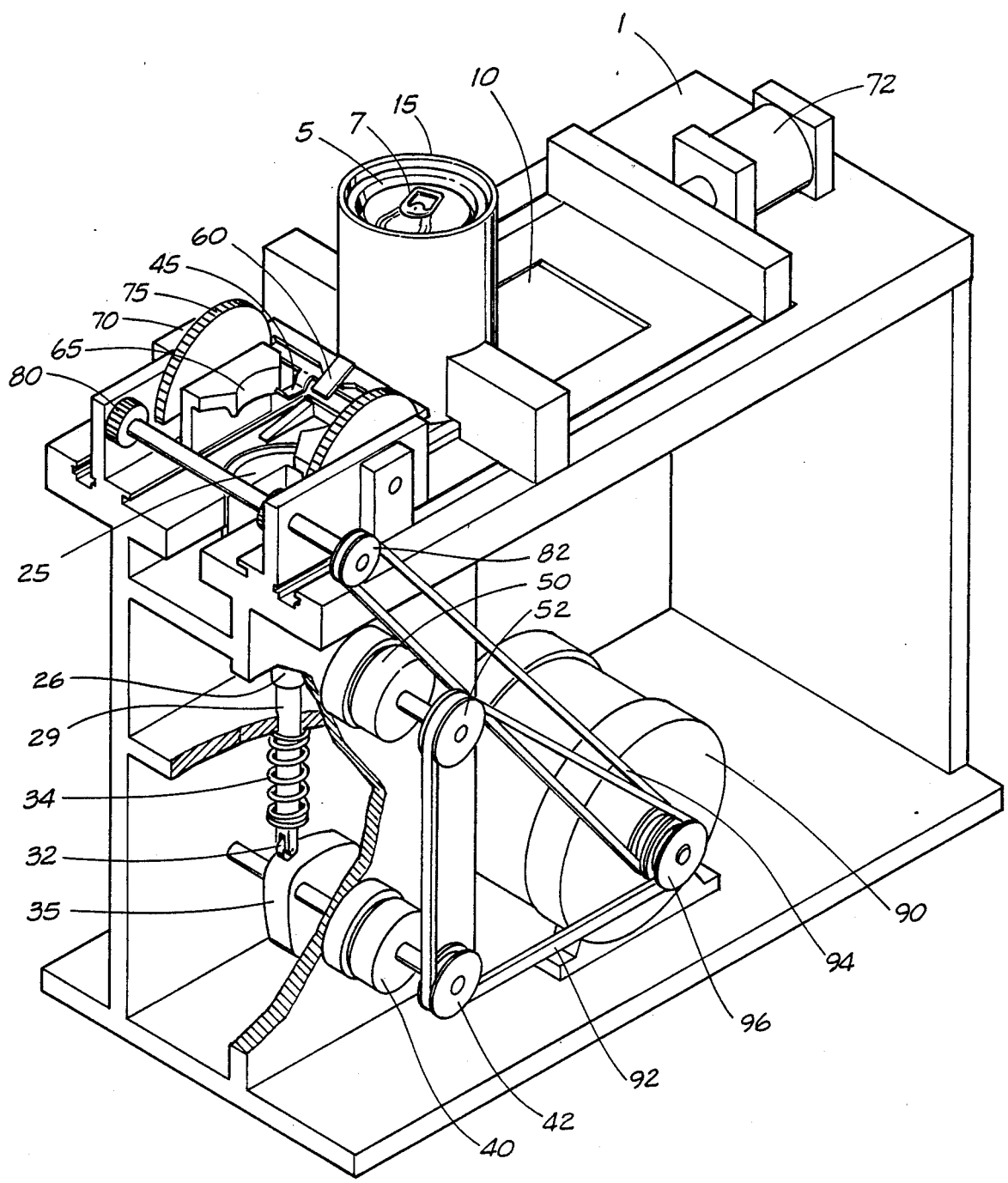
FIG. 1 is a perspective view of the testing device of the instant invention.

The operation of a preferred embodiment of the can lid tester of the present invention will be better understood by referring to the accompanying drawings wherein like reference characters in the several figures represent like elements.

The can lid tester is provided with a rigid frame 1 upon which is rigidly mounted a rotary power source 90, a manifold 15, linear actuators 12 and 72, and lid clamp jaws 65. Rotary power source 90 continuously rotates double power sheave 96. Power sheave 96 is connected to and provides continuous motive power for drive sheaves 42, 52, and 82 through drive belts 92 and 94. Thus, drive sheaves 42, 52, and 82 are rotated at a constant speed throughout the operation of the machine. Other components of the device are slidably or rotatably mounted upon frame 1, the function and means of mounting of these will become obvious from the following description. Other significant features of the invention include a feed slide 10, a vertical transfer carrier 25, a rotating vertical shaft 26, a non-rotating vertical shaft 29, a cam 35, a cam follower 32, a large bevel gear 55, a small bevel gear 57, a tab testing slide 70, a tab orienting finger 45, and a tab operating finger 60.

Feed slide 10 is slidably mounted onto frame 1 so that reciprocation of slide 10 will result in the stripping of a can lid 5 from a stack of lids placed in manifold 15, movement of the selected can lid 5 to the test position wherein it engages vertical transfer carrier 25, and subsequent ejection of the tested can lid 5 from the device. Vertical transfer carrier 25 is attached to rotating vertical shaft 26, which is both slidably and rotatably mounted on frame 1. Vertical shaft 26 in turn is slidably engaged through drive key 27 to small bevel gear 57, which is rotatably mounted on frame 1. Rotating vertical shaft 26 is further rotatably coupled at coupler point 28 with non-rotating shaft 29, which is slidably mounted on frame 1 in linear alignment with vertical shaft 26. Cam follower 32, which is attached to non-rotating shaft 29, slidably engages cam 35, which is rotatably mounted on frame 1. Rotation of cam 35 is controlled by four position clutch 40, which is interposed between cam 35 and sheave 42. Small bevel gear 57 engages large bevel gear 55, which is rotatably mounted on frame 1. Rotation of large bevel gear 55 is controlled by single turn clutch 50 which is interposed between large bevel gear 55 and sheave 52. Both four position clutch 40 and single turn clutch 50 receive rotating power through drive sheaves 42 and 52, respectively, which are powered by drive belt 92. Drive belt 92 is powered by power sheave 96 which is mounted on the rotating shaft of power source 90.

Also slidably mounted onto frame 1 is tab testing slide 70. Gear sector 75 is rotatably mounted upon tab testing slide 70. Tab operating finger 60 is mounted upon tab testing slide 70 in such a fashion that rotation of gear sector 75 will produce a corresponding rotation of tab operating finger 60. When tab testing slide 70 is in the forward testing position, gear sector 75 engages drive gear 80 and causes tab operating finger 60 to rotate at least ninety degrees thereby testing the easy-open feature in a manner akin to that employed by the consumer. Drive gear 80 is rotatably mounted on frame 1 and receives rotating power from sheave 82 which in turn is powered by drive belt 94. Like drive belt 92, drive belt 94 is powered by power sheave 96.

Figure 2:
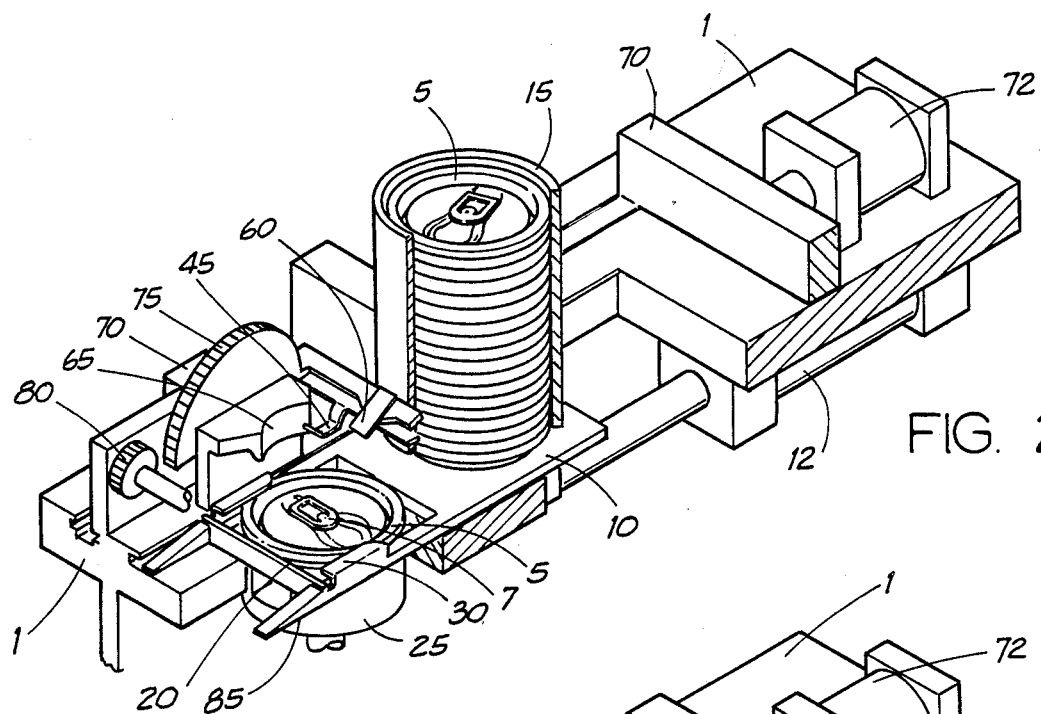
FIG. 2 is a partial sectional view showing lid feed slide in forwardmost position.
Figure 3:
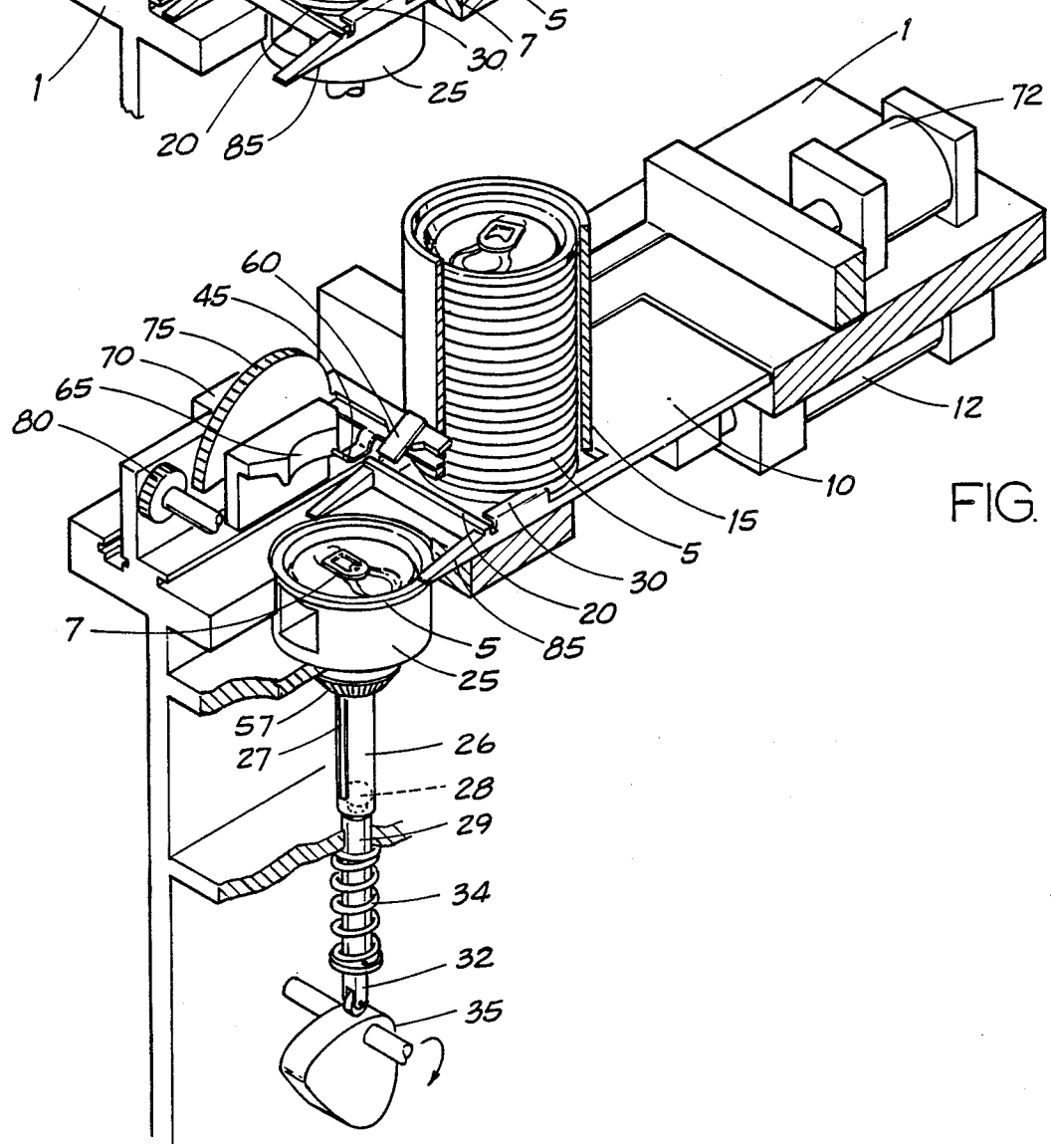
FIG. 3 is a partial sectional view showing vertical transfer carrier in lowered position.
Figure 4:
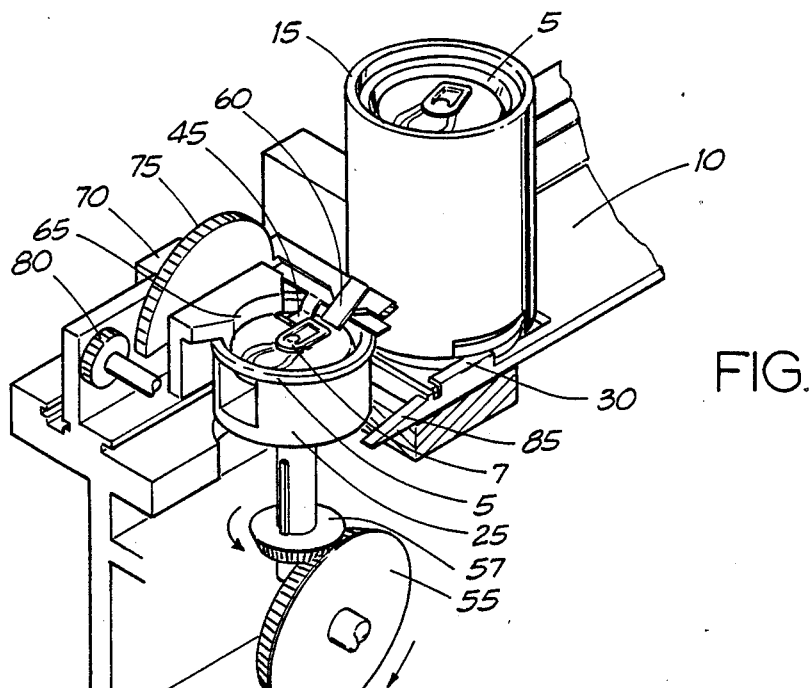
FIG. 4 is a partial sectional view showing lid orientation.
Figure 5:
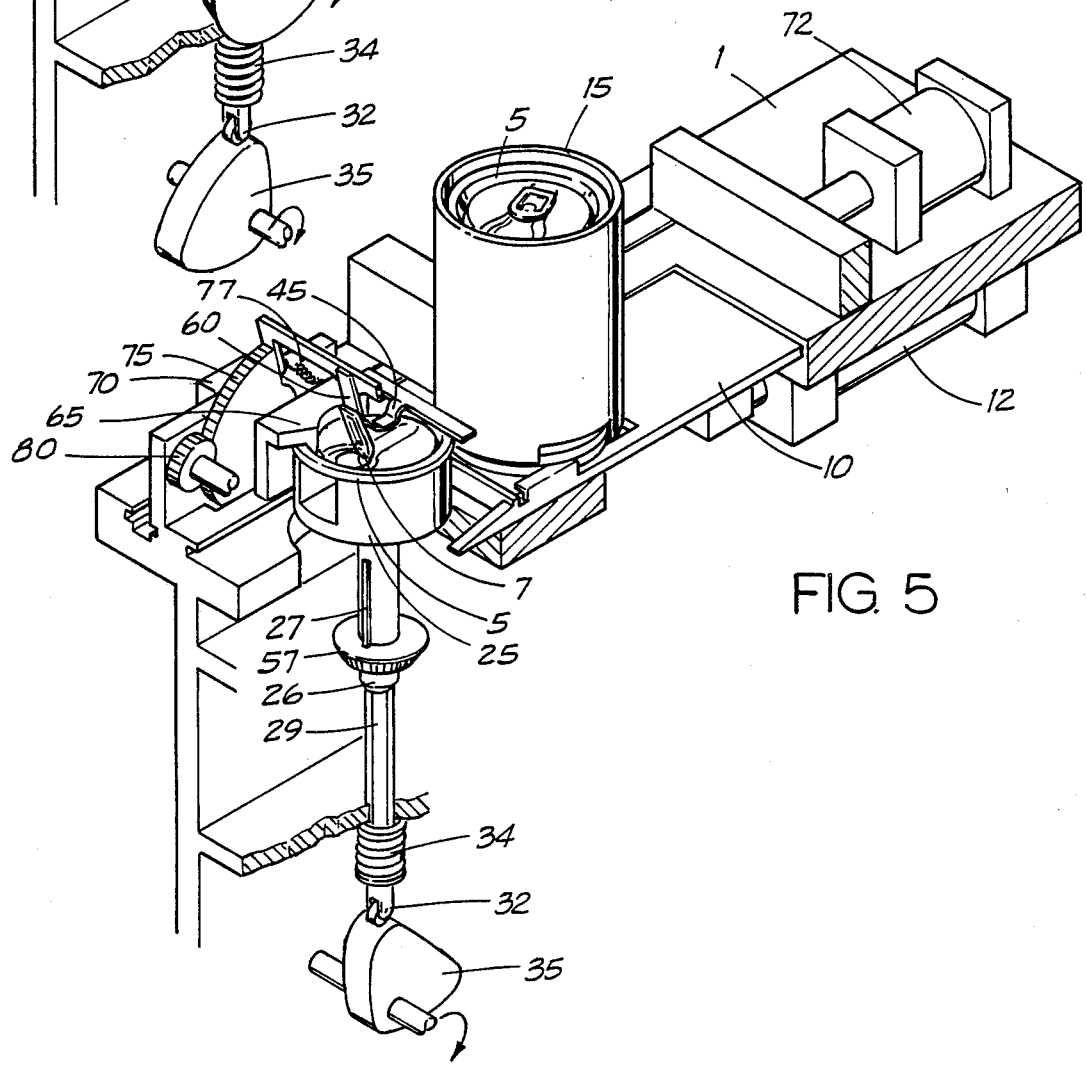
FIG. 5 is a partial sectional view showing testing of easy-open feature.

Operation of the can lid testing device will be further understood by the following descriptive narrative of the operation of the machine. A plurality of can lids 5, stacked so that the tab of the scored segment of each lid is on the upper side of the lid, are loaded into manifold 15 (FIG. 1). At this point, reciprocating slides 10 and 70 are both in the retracted or rearward position. As the test cycle commences, slide 10 moves forward. Separator blades 30, which are of conventional design and are mounted upon slide 10, remove one lid 5 from the bottom of the stack of lids in manifold 15 and position the lid in horizontal carrier 20, which is a portion of slide 10. As slide 10 continues to move forward, lid 5 is moved to a position over vertical transfer carrier 25 (FIG. 2). When slide 10 reaches the forward position, lid 5 is deposited on vertical transfer carrier 25. At this point, slide 10 activates a sensor which in turn activates four position clutch 40 and causes cam 35 to rotate one quarter turn. This causes cam follower 32, operating through shafts 29 and 26, to lower vertical transfer carrier 25 thereby allowing slide 10 to return to its retracted position (FIG. 3). Once slide 10 has returned to its retracted position, the sensor once again activates four position clutch 40 and causes cam 35 to rotate an additional one quarter turn thereby causing cam follower 32, operating through shafts 29 and 26, to raise vertical transfer carrier 25 to a position wherein tab orienting finger 45 lightly rests on the top surface of lid 5. When this is accomplished, single turn clutch 50 is activated and causes large bevel gear 55 to make one complete rotation. As a result of the difference in the number of teeth on large bevel gear 55 and the number of teeth on small bevel gear 57, one revolution of large bevel gear 55 will cause small bevel gear 57 to rotate approximately twice. As small bevel gear 57 rotates, it acts through drive key 27 to cause vertical shaft 26 and vertical transfer carrier 25 to rotate. As vertical transfer carrier 25 rotates, lid 5 rotates with it until tab 7 of lid 5 engages tab orienting finger 45 (FIG. 4). When this occurs, lid 5 will slip with respect to vertical transfer carrier 25 and will be held in a properly oriented position until vertical transfer carrier 25 completes rotation. It will be understood that two rotations will accommodate any random orientation of the easy-open feature, including the condition wherein the easy-open feature is properly oriented without rotation of vertical transfer carrier 25 and the condition wherein the easy-open feature is located very slightly past the proper orientation and thus requires at least one full revolution for proper orientation. By utilizing two full revolutions, it is thus guaranteed that tab 7 of the easy-open feature will be properly positioned by tab orienting finger 45. When single turn clutch 50 has completed one full revolution of large bevel gear 55, four position clutch 40 is activated which in turn rotates cam 35 an additional one quarter turn thereby causing cam follower 32, operating through shafts 29 and 26, to raise vertical transfer carrier 25 into clamping engagement with clamp jaws 65. With the lid now clamped between vertical transfer carrier 25 and clamp jaws 65, tab testing slide 70 is moved forward by linear actuator 72. As tab testing slide 70 moves forward, tab operating finger 60 engages tab 7 and slightly raises the tab. When tab testing slide 70 reaches its extended position, gear sector 75 engages continuously rotating drive gear 80 which in turn causes tab operating finger 60 to rotate at least ninety degrees and thereby rotate tab 7 through at least a ninety degree arc (FIG. 5). This movement simulates the action of the consumer in opening the can. Following completion of the rotation of tab operating finger 60, tab testing slide 70 is returned to its retracted position. As slide 70 withdraws, return springs 77 rotate gear sector 75 and attached tab operating finger 60 back to the starting position in preparation for the testing of the next lid. When tab testing slide 70 has returned to its retracted position, four position clutch 40 is again activated which rotates cam 35 an additional one quarter turn. This causes cam follower 32, operating through shafts 29 and 26, to lower vertical transfer carrier 25 to its initial position. At this point, the tested lid is resting on vertical transfer carrier 25 and vertical transfer carrier 25 is in the same position as it was before the cycle began.

As the next cycle is started, slide 10 once again strips a lid 5 from manifold 15 and moves it toward vertical transfer carrier 25. This action serves to eject the previously tested lid from vertical transfer carrier 25. The cycles can be automatically repeated until each of the lids located in manifold 15 has been tested.

Detection of improperly opened lids, as they are ejected from vertical transfer carrier 25, may be performed by any of numerous known techniques, such as visual inspection, photocell, mechanical means, air blast or any other means suitable for detecting a difference in condition between a properly opened lid and an improperly opened lid. It can be appreciated from the foregoing description that the instant device provides a simple means for testing a large number of can lids in a consistent, repeatable manner and in a manner consistent with actual use made of the easy-open feature.

Although the present invention has been described and illustrated with respect to a preferred embodiment thereof, it is to be understood that it is not to be so limited since changes and modifications may be made therein which are within the full intended scope of this invention as hereinafter claimed.

What is claimed is:

1. A device for testing a plurality of can lids equipped with a tab operated easy-open feature to determine the proper functioning of said easy-open feature comprising a magazine for holding the can lids which are to be tested; a mechanism which removes one can lid from the magazine and transports said lid to an orientation position; a mechanism which orients said selected can lid until said easy-open feature is in a preselected orientation with respect to a testing mechanism; a testing mechanism consisting of a clamping device which holds said selected lid firmly in position and an activating mechanism which engages said tab of said easy-open feature and rotates said tab through an arc with respect to the plane of said lid thereby activating said easy-open feature in the fashion in which a consumer would activate said feature; and a mechanism for ejecting the tested lid from the device.

2. A device according to claim 1 wherein said means for selecting said can lid and transporting it to said orientation position consists of a reciprocating slide.

3. The device according to claim 2 wherein said reciprocating slide is equipped with selector fingers which select one lid from the plurality of lids contained in the magazine.

4. The device according to claim 2 wherein the motive device for said reciprocating slide is a linear actuator.

5. The device according to claim 4 wherein said linear actuator is a pneumatic cylinder.

6. A device according to claim 1 wherein said orientation mechanism is a rotatable mechanism which rotates said selected can lid until said easy-open feature is in the desired orientation.

7. A device according to claim 6 wherein the proper orientation of said easy-open feature is controlled by a locating finger which engages said easy-open feature when it is in the proper position for testing.

8. A device according to claim 7 wherein rotation of said orientation mechanism continues after said selected can lid is properly oriented, said selected can lid being restrained from further rotation by said locating finger until said orientation mechanism completes its prescribed cycle of rotation.

9. A device according to claim 1 wherein said activating mechanism consists of a reciprocating slide having a testing finger rotatably mounted thereon whereby linear activation of said slide causes said testing finger to engage said tab of said easy-open feature of said can lid and rotates said tab of said easy-open feature in an arc with respect to the plane of said selected can lid thus activating said easy-open feature.

10. A device according to claim 9 wherein said reciprocating slide is motivated by a linear actuator.

11. A device according to claim 10 wherein said linear actuator is a pneumatic cylinder.

12. A device according to claim 1 wherein the mechanism, which feeds said selected can lid into said orientation mechanism, also serves to eject any previously tested can lid from said device.

13. A device for testing the proper operation of a tab operated easy-open feature of a can lid consisting of a container for holding a plurality of can lids; a first reciprocating slide provided with a means for selecting a single lid from said container and transporting said lid to a second position wherein said can lid is deposited upon a carrier; an orientation mechanism attached to said carrier which orients said can lid to the proper position for testing of said tab operated easy-open feature of said can lid; a clamping mechanism capable of interacting with said carrier to positively hold said selected can lid in the proper position for testing; and a testing mechanism consisting of a second reciprocating slide equipped to engage the tab of said easy-open feature of said can lid and rotate said tab with respect to the plane of said can lid so as to activate said easy-open feature of said can lid.

14. A device according to claim 13 wherein said first and said second reciprocating slides are motivated by a first and a second linear actuator.

15. A device according to claim 14 wherein said first and said second linear actuators are pneumatic cylinders.

16. A method for testing the proper operation of the tab operated easy-open feature of a can lid consisting of selecting a suitable sample of can lids to be tested, depositing said can lids in the feed magazine of a testing device, activating said testing device whereby a feed mechanism removes one can lid from said magazine and transports said can lid to a testing carrier which carrier is then rotated until said tab operated easy-open feature is in the desired position for testing, clamping said can lid and said carrier to prevent movement of said can lid, and engaging the tab of said easy-open feature with an activating mechanism which causes said tab to rotate through an arc with respect to the plane of said can lid and thereby activate said easy-open feature in the fashion in which a consumer would activate said feature, and ejecting said tested lid from said device.

17. A method for testing the proper operation of a tab operated easy-open feature of a can lid consisting of selecting a sample of can lids to be tested, placing said can lids in a receptacle portion of a testing device, activating said testing device whereby a first reciprocating slide selects a single lid from the lids in said receptacle and transports said lid to a second position where said can lid is deposited upon a carrier, rotating said carrier to orient said can lid in the proper position for testing of said tab operated easy-open feature, clamping said can lid in said carrier for testing, and testing the operation of said tab operated easy-open feature by engaging said tab with a testing mechanism consisting of a reciprocating slide equipped to engage the tab of said easy-open feature of said can lid and rotating said tab with respect to the plane of said can lid so as to activate said easy-open feature of said can lid in the fashion in which a consumer would activate said easy-open feature and ejecting said tested lid from said device.

* * * * *